March 11, 1958  I. R. METCALF  2,826,257
POWER STEERING DEVICES
Filed March 2, 1954  5 Sheets-Sheet 1

INVENTOR:
Irving R. Metcalf,
BY
Owen, McDougall, Williams & Herek,
ATTORNEYS

March 11, 1958     I. R. METCALF     2,826,257
POWER STEERING DEVICES
Filed March 2, 1954     5 Sheets-Sheet 2
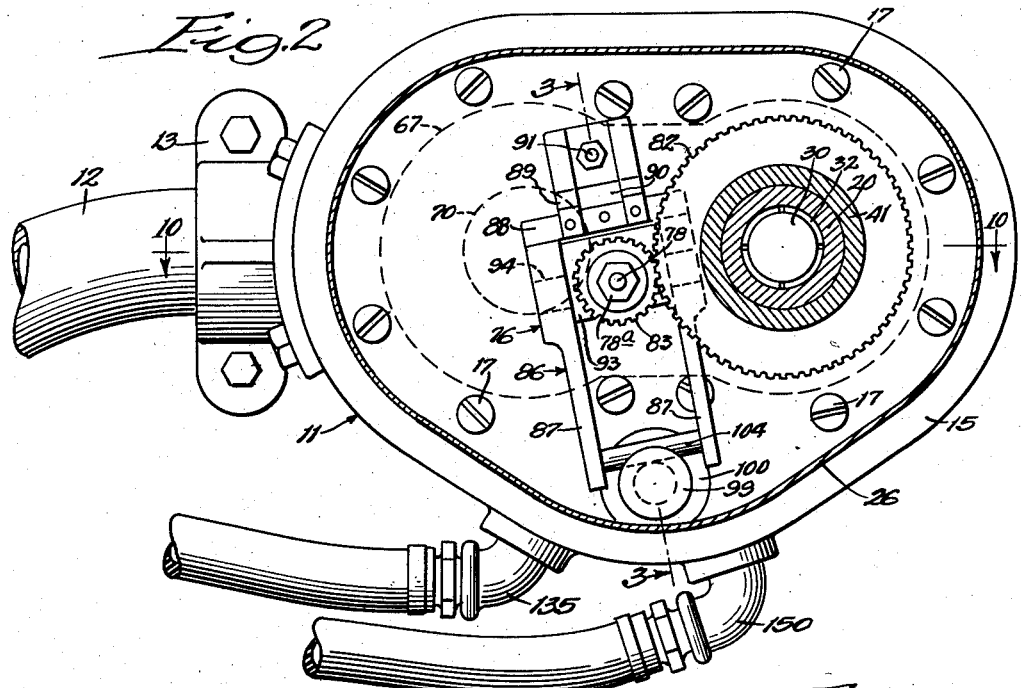
INVENTOR:
Irving R. Metcalf,
BY
ATTORNEYS.

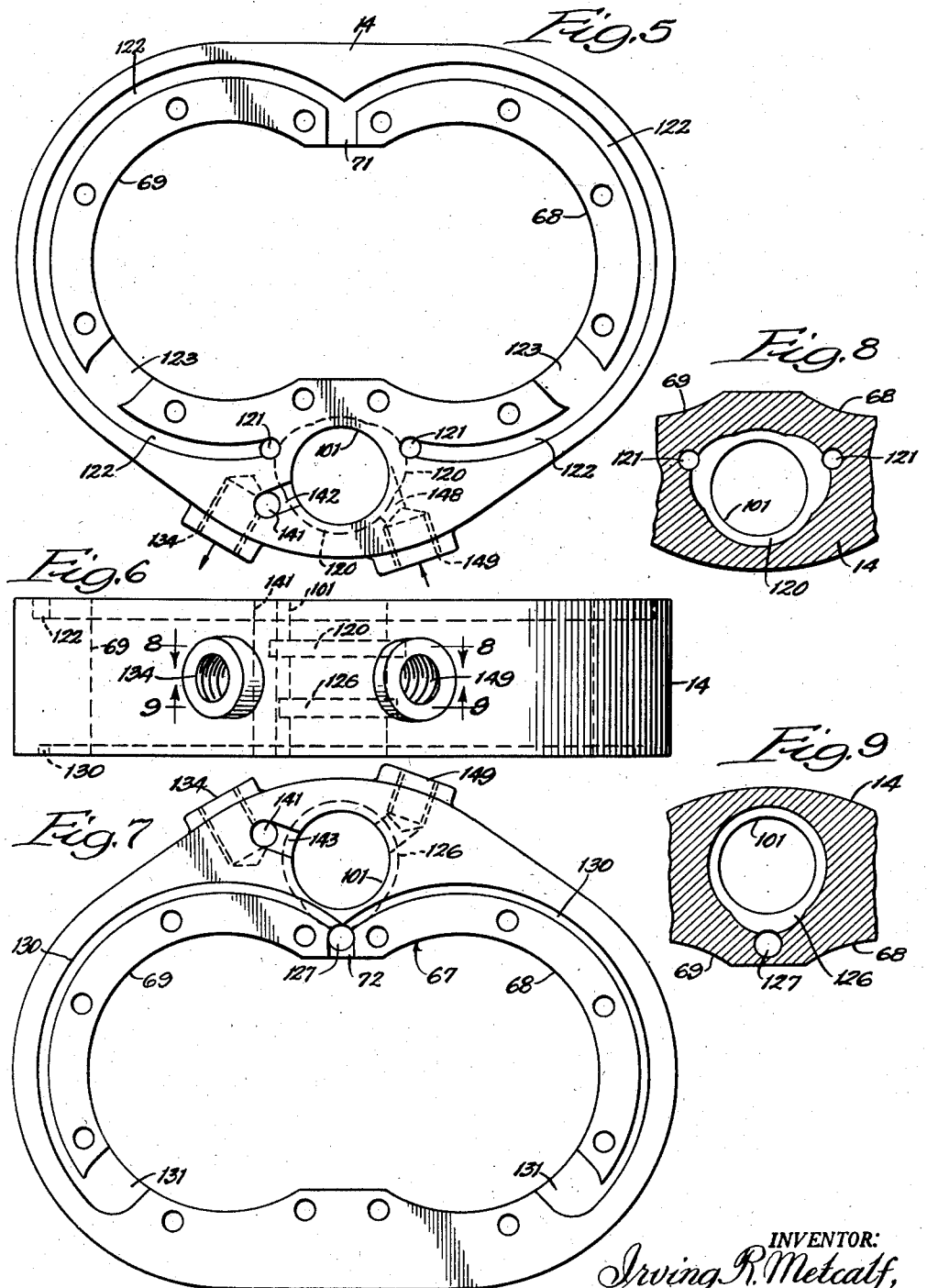

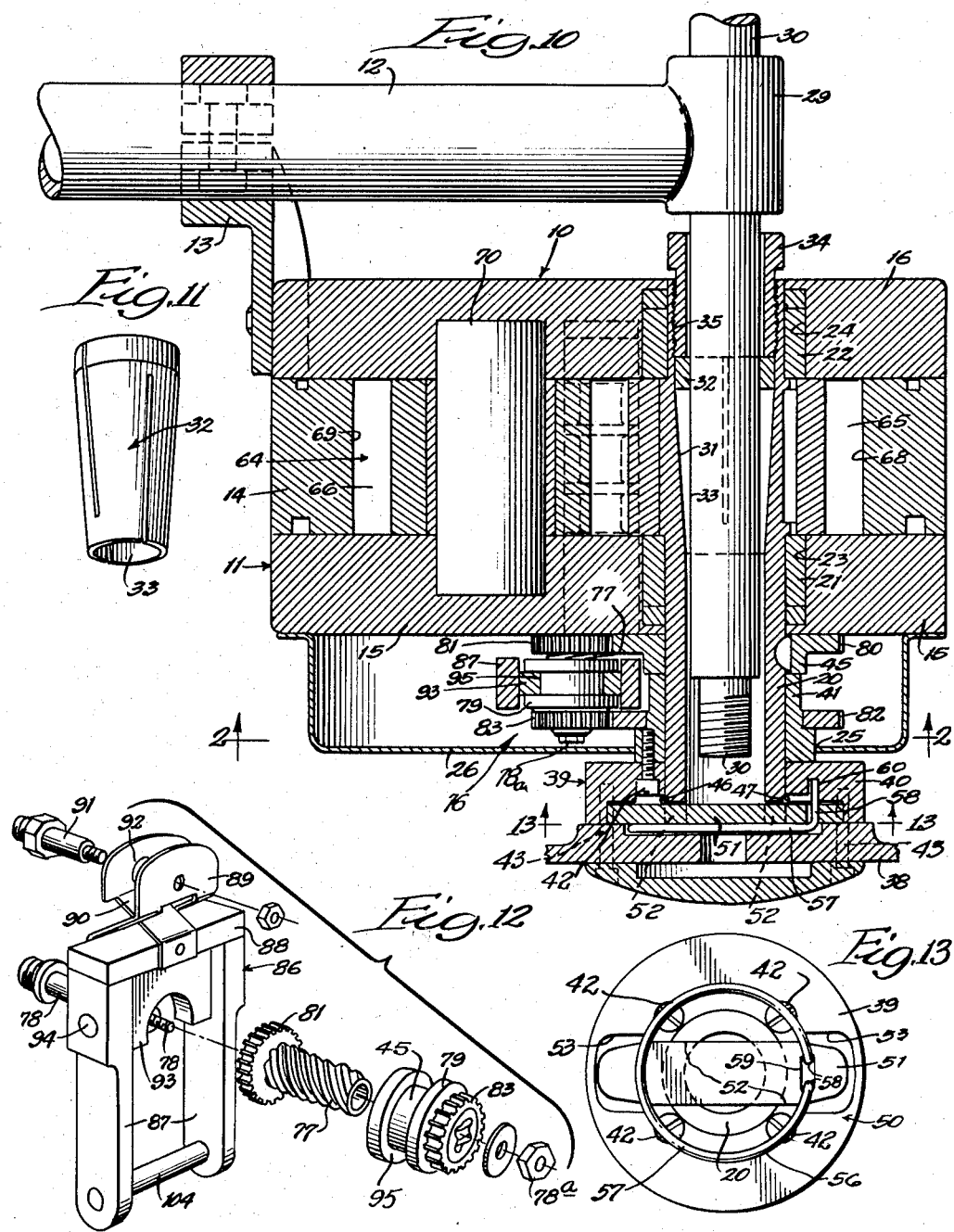

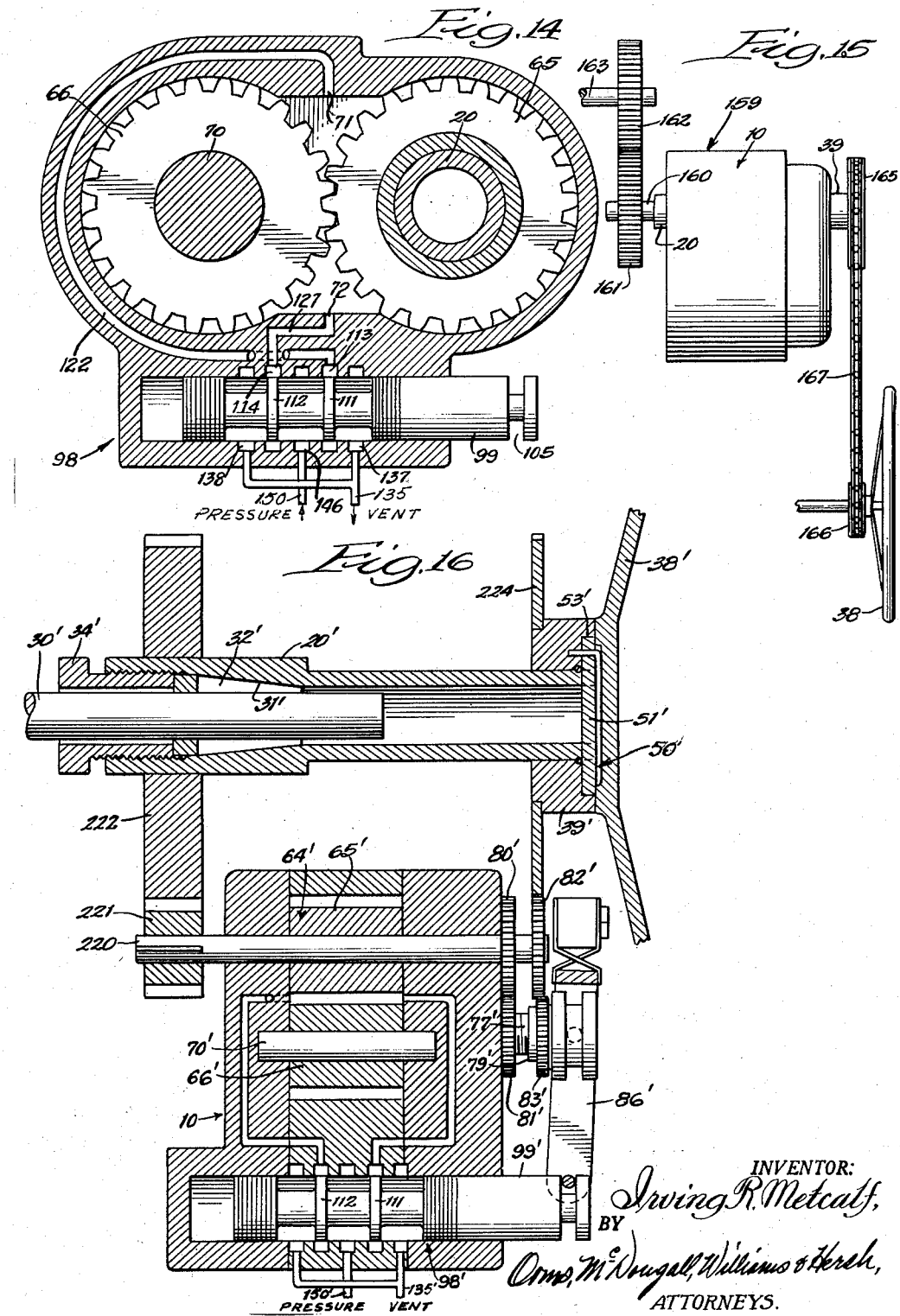

United States Patent Office 2,826,257
Patented Mar. 11, 1958

2,826,257
POWER STEERING DEVICES

Irving R. Metcalf, St. Charles, Ill., assignor to Dunbar Kapple, Inc., a corporation of Illinois Application March 2, 1954, Serial No. 413,594

8 Claims. (Cl. 180—79.2)

The present invention relates to power steering devices and other similar servomechanisms, particularly devices for steering vehicles such as tractors, self-propelled machines, trucks and automobiles, for example.

One object of the invention is to provide an improved power steering device which may be installed as an accessory on an existing vehicle without modifying the vehicle in any substantial way.

A further object is to provide a power steering device which may be connected into the steering mechanism on an existing vehicle by mounting the device on any existing shaft in the mechanism, without any need for modifying or damaging the shaft.

A more particular object is to provide a power steering device which may be inserted between the steering wheel and the upper end of the steering wheel shaft on a vehicle, without modifying the shaft.

It is another object of the invention to provide an improved power steering device which ordinarily supplies all of the necessary steering effort, but is arranged so that extra effort may be supplied manually and so that the steering may be done solely by manual effort, if necessary.

Another object is to provide a power steering device embodying improved means for detecting any relative rotation between the steering wheel and the steering wheel shaft and thereupon causing the development of a steering torque to restore the steering shaft to a condition of angular alignment or neutrality, relative to the steering wheel.

It is a further object to provide an improved power steering device which is rugged and dependable yet easy to manufacture and inexpensive.

Further objects and advantages of the invention will appear from the following description of various illustrative embodiments, as shown in the accompanying drawings in which:

Fig. 2 is a sectional view of the power steering device, taken generally along a line 2—2 in Fig. 10.

Fig. 3 is a sectional view taken generally along a line 3—3 in Fig. 2 showing the power steering device with its parts in their neutral positions.

Fig. 4 is similar to Fig. 3, but with the parts of the steering device in the position they assume when the device is developing a clockwise steering torque.

Figure 1:
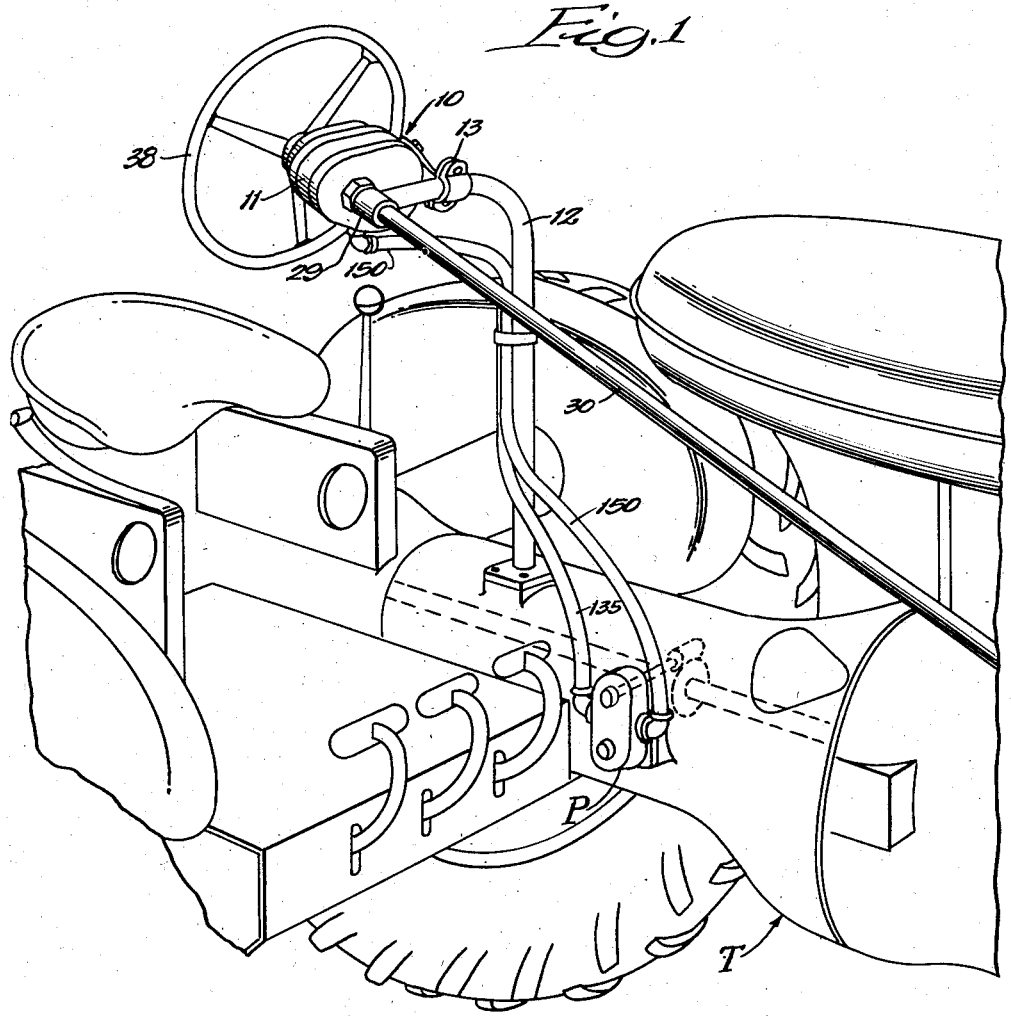
Figure 1 is a perspective view showing an exemplary power steering device mounted on the steering wheel shaft of a conventional farm tractor.

Figs. 5, 6 and 7 are top, side and bottom views, respectively, of a housing block employed in the power steering device with Figs. 5 and 7 taken along the lines 5—5 and 7—7 of Fig. 3.

Fig. 8 is a fragmentary sectional view taken along a line 8—8 in Fig. 6.

Fig. 9 is a fragmentary sectional view taken along a line 9—9 in Fig. 6.

Fig. 10 is a sectional view taken generally along a line 10—10 in Fig. 2.

Fig. 11 is a perspective view of a tapered chuck employed in the power steering device to attach the device to the steering shaft of the tractor or other vehicle.

Fig. 12 is an exploded perspective view of a control mechanism employed in the power steering device.

Fig. 13 is a fragmentary sectional view taken along a line 13—13 in Fig. 10.

Fig. 14 is a diagrammatic view showing the arrangement of the hydraulic system embodied in the power steering device; certain parts being shown out of position for clarity of illustration.

Fig. 15 illustrates a modified arrangement whereby the power steering device may be connected into a steering system of a different type from that shown in Fig. 1, and Fig. 16 is a diagrammatic view of a modified power steering device, embodying the present invention.

Considered in greater detail, Figs. 1–14 of the drawings illustrate a power steering device 10 adapted to be mounted on a farm tractor T or some other vehicle having a power driven variable delivery hydraulic pump P for supplying hydraulic fluid under pressure to operate the device. In this instance, the power steering device 10 comprises a housing 11 provided with a suitable bracket 13 for attaching the power steering device 10 to a supporting post 12 or other member on the tractor T. The illustrated housing 11 is made up of a hollow block 14 having top and bottom end plates 15 and 16 secured against its upper and lower faces by means of suitable screws 17 or other fasteners.

Journaled in the housing 11 is a main hollow power shaft or quill 20 supported on bearings 21 and 22 which are mounted in aligned bores 23 and 24 formed in the top and bottom plates 15 and 16. The upper end of the hollow shaft 20 extends beyond the top plate 15 and through an opening 25 formed in a cover pan 26 mounted on top of the housing 11.

The power steering device 10 may be mounted on any shaft in the steering mechanism of a vehicle without modifying or damaging the shaft. In the illustrated case, for example, the steering device is connected to a conventional steering wheel shaft 30, journaled in a bearing 29 mounted on the upper end of the supporting post 12 on the tractor T. The steering device is installed by removing the usual steering wheel 38 and slipping the hollow shaft 20 over the upper end of the steering shaft 30. An upwardly tapering bore 31 is formed in the shaft 30 to receive a longitudinally slotted, tapered chuck or collet 32 having a bore 33 for receiving the steering shaft 30. The tapered chuck 32 may be wedged between the bore 31 and the steering shaft 30 by screwing a hollow nut 34 into an internally threaded portion 35 at the lower end of the bore 31. In this way the hollow shaft 20 may be securely locked in place without damaging the shaft 30.

To mount the steering wheel 38 on the power steering device 10, a wheel hub 39 is rotatably mounted on the upper end of the hollow shaft 20. In this instance, the wheel hub 39 is formed in upper and lower parts 40 and 41 secured together by suitable screws 42. The steering wheel 38 may be suitably attached to the upper part 40, as by screws 43 or other means. The lower end of the lower hub part 41 bears against an inner hub 45 keyed or otherwise fixed to the hollow shaft 20 immediately above the top plate 15. To retain the wheel hub 39 on the shaft 20, a split ring 46 is mounted in a peripheral groove 47 formed in the shaft 20 adjacent its upper end.

To provide for manual operation of the main shaft 20, a lost motion connection 50 is arranged between the wheel hub 39 and the upper end of the shaft. In this instance, the lost motion connection is formed by a wheel key or bar 51 mounted snugly in opposite radial slots 52 formed at the upper end of the shaft 20. The ends of the wheel key 51 extend into diametrically opposite oversized recesses 53 formed in the upper portion of the wheel hub 39. It will be seen that the recesses 53 are of sufficient size to permit a substantial amount of lost angular motion between the steering wheel 38 and the main shaft 20. However, once the lost motion is taken up, the shaft 20 may be positively turned by rotating the steering wheel 38. To improve the feel of the steering wheel 38, a spring 56 is arranged so that it will tend to center the wheel 38 in its range of lost motion relative to the main shaft 20. In this instance, the spring 56 includes a segmental wire ring 57 having a pair of spaced prongs 58 bent at right angles to the plane of the ring. The spring is arranged with the prongs 58 extending through a slot 59 in the wheel key 51 and into a recess 60 formed in the wheel hub 39. Rotating the wheel hub 39 in either direction from its neutral position will compress the spring 56 and thereby generate a resilient restoring force.

To provide for power actuation of the hollow main shaft 20, the steering device 10 is provided with a hydraulic actuator 64 which, in this instance, comprises a pair of meshing gears 65 and 66 mounted in a gear chamber 67 formed by overlapping bores 68 and 69 in the housing block 14. The gear 65 is keyed or otherwise fixed to the main shaft 20 while the gear 66 is rotatably mounted on an idler spindle 70. To provide for admission and escape of hydraulic fluid, the gear chamber 67 is provided with ports 71 and 72 in the form of grooves formed in the end faces of the block 14 adjacent the point of meshing between the gears 65 and 66. In this instance, the port 71 is formed in the top face of the block 14 on one side of the gears, while the port 72 is formed in the bottom of the block adjacent the other side of the gears.

Provision is made for controlling the hydraulic actuator 64 so that the power shaft 20 will follow the steering wheel 38. To this end, a differential rotation detector 76 is provided to sense any relative rotation between the wheel hub 39 and the main shaft 20. The illustrated differential detector 76 comprises a quadruple threaded screw 77 rotatably mounted on a stud 78 secured to the upper face of the top plate 15. By means of a nut 78a threaded onto the stud 78, the screw 77 is retained against axial translation. Received on the screw 77 is a rotatable nut 79 which is free to move axially. To connect the shaft 20 to the screw 77, a pair of meshing gears 80 and 81 are provided on the inner hub 45 and the screw 77, respectively. Likewise, meshing gears 82 and 83 are provided on the wheel hub 39 and the nut 79. In this way, the screw 77 is rotated in proportion to any rotation of the shaft 20, and the nut 79 is rotated in proportion to rotation of the wheel hub 39. It will be apparent that any relative rotation between the shaft 20 and the wheel hub 39 will result in the nut 79 being moved axially along the screw 77.

The axial movement of the nut 79 is amplified by means of a lever 86 comprising a pair of spaced arms 87 connected together at their inner ends by means of a block 88. Z-shaped springs 89 and 90 are secured to the block 88 and mounted on a stud 91 fixed to the top plate 15, a spacer 92 being interposed between the anchored ends of the springs 89 and 90. In this way, the lever 86 is mounted for upward and downward swinging movement. The lever 86 is connected to the nut 79 by means of a yoke 93 having pivots 94 journaled in the arms 87. The yoke 93 is received in an annular groove 95 formed on the nut 79.

To control the hydraulic actuator 64, the steering device 10 is equipped with a reversing valve 98, including a valve spool 99 slidable in a valve sleeve 100 which is received in aligned bores 101, 102 and 103 formed in the block 14 and the top and bottom plates 15 and 16. The lever 86 is connected to the spool 99 by means of a pin 104 which extends between the outer ends of the arms 87 and is received in an annular groove 105 formed at the upper end of the spool.

In order to control the flow of hydraulic fluid to the actuator 64, the illustrated spool 99 is formed with three peripheral grooves 108, 109 and 110 defining a pair of lands 111 and 112 which are centered over a pair of internal grooves 113 and 114 when the valve spool is in its neutral position, the grooves 113 and 114 being formed in the valve sleeve 100. In the illustrated arrangement, the lands 111 and 112 are slightly narrower than the grooves 113 and 114 with the result that substantial leakage of the hydraulic fluid is permitted when the valve is in its neutral position. The sleeve 100 is formed with sets of radial actuator ports 115 and 116 communicating with the grooves 113 and 114.

To connect the valve ports 115 to the actuator port 71, a groove 120 of generally annular form is arranged in the bore 101 so as to register with the ports 115. Two axial bores 121 are provided between the top face of the block 14 and the groove 120. Arcuate grooves 122 in the top of the block 14 extend from the bores 121 around the gear chamber bores 68 and 69 to the port 71. Radial grooves 123 are arranged between the arcuate grooves 122 and the gear chamber bores 68 and 69 at points generally diametrically opposite from the port 71 so as to equalize the pressure at these opposite points and thereby minimize side thrust on the gears 65 and 66.

The other set of valve ports 116 is connected to the other actuator port 72 by means including a generally annular groove 126 formed in the bore 101 so as to register with the ports 116. An axial bore 127 extends between the bottom of the block 14 and the groove 126. It will be seen that the axial bore 127 communicates directly with the port 72.

In order to minimize side thrust on the gears 65 and 66, arcuate grooves 130 are formed in the bottom face of the block 14 around the gear chamber bores 68 and 69 so as to extend between the bore 127 and respective ports 131 communicating with the gear chamber bores 68 and 69 at points opposite from the port 72.

To provide for escape of hydraulic fluid from the actuator 64, the power steering device 10 is provided with an outlet or vent opening 134 adapted to receive an outlet conduit 135. The outlet opening 134 is connected to two sets of outlet ports 137 and 138 extending radially through the sleeve 100 at points opposite the grooves 108 and 110 in the ends of the valve spool 99. Annular grooves 139 and 140 are provided around the outside of the sleeve 100 to register with the ports 137 and 138. Connections between the outlet opening 134 and the grooves 139 and 140 are afforded by an axial bore 141 extending through the block 14 and arranged to intersect with the outlet opening. Grooves 142 and 143 are formed in the top and bottom faces of the block 14 between the bore 141 and the grooves 139 and 140.

For the purpose of receiving hydraulic fluid under pressure from the variable delivery pump P, the sleeve 100 is arranged with a set of inlet ports 146 located opposite the groove 109 in the spool 99, midway between the actuator grooves 113 and 114. The ports 146 are interconnected by means of an annular groove 147 formed in the outside of the sleeve 100. A passage 148 extends between the groove 147 and an inlet opening 149 adapted to receive an inlet conduit 150.

While the operation of the steering device 10 will be understood from the foregoing description, it may be helpful to offer a brief résumé. The steering device 10 may be installed by mounting the hollow power shaft 20 on the steering shaft 30 of the vehicle. The mounting bracket is secured to the vehicle body to anchor the housing 11 against rotation and the steering wheel 38 is connected to the wheel hub 39. The inlet 149 is connected to a suitable hydraulic pump on the vehicle and the outlet 134 is connected to a sump or the like. In this way, a pressure differential is constantly maintained between the inlet 149 and the outlet 134.

When the steering wheel 38 and the steering shaft 30 are both stationary and no torque is being applied to either the wheel or the shaft, it may be said that normal or neutral conditions exist in the power steering device 10. Under these conditions, the wheel key 51 is centered in the hub recesses 53 and the differential nut 79 is centered along the screw 77. Likewise, the valve spool 99 is in its neutral position with the lands 111 and 112 centered over the grooves 113 and 114. Since the lands do not completely cover the grooves the hydraulic fluid may leak from the inlet ports 146 around the lands 111 and 112 to the vent ports 137 and 138. However, equal fluid pressures will be applied to both sets of actuator ports 115 and 116 with the result that the actuator 64 will not develop any torque.

If the driver of the vehicle turns the steering wheel 38 clockwise, the gears 82 and 83 will turn the nut 79 counterclockwise so as to advance the nut upwardly on the screw 77. This will result in upward movement of the lever 86 and the valve spool 99. Accordingly the lands 111 and 112 will progressively uncover the lower portions of the grooves 113 and 114 so as to establish communication between the inlet ports 146 and the actuator ports 115 in the valve sleeve 100. Likewise, communication will be established between the actuator ports 116 and the vent ports 138.

As a result of the increased pressure at the valve ports 115 and the decreased pressure at the valve ports 116, a differential hydraulic pressure will be developed between the ports 71 and 72 on the actuator 64. The magnitude of the differential pressure will depend upon the extent of movement of the valve spool 99. The differential pressure will result in clockwise rotation of the power gear 65 and the main shaft 20. Accordingly, the gears 80 and 81 will rotate the differential screw 77 counterclockwise so as to move the nut 79 downwardly. In this way, the valve spool 99 will be returned to its neutral position when the shaft 20 has been rotated into alignment with the wheel hub 39.

If the steering wheel 38 is turned counterclockwise by the vehicle driver, the differential nut 79 and the valve spool 99 will be moved downwardly. As a result, a differential hydraulic pressure will be applied between the actuator ports 72 and 71 and the power gear 65 will be turned counterclockwise. This will rotate the screw 77 clockwise and thus will tend to restore the differential nut 79 and the valve spool 99 to their neutral positions.

It will be apparent that the power steering device 10 operates to rotate the steering shaft 30 so that it will follow the steering wheel 38. The operation of the steering device 10 is also such that the steering shaft 30 will be restored to a condition of alignment with the steering wheel 38 if the steering shaft is turned due to the action of bumpy or irregular ground on the steered wheels of the vehicle. If the steering shaft 30 is turned clockwise while the steering wheel 38 remains stationary, the differential screw 77 will be turned counterclockwise and the nut 79 thus will be screwed downwardly. The resulting downward movement of the valve spool 99 will cause the actuator 64 to develop a counterclockwise steering torque which will tend to restore the steering shaft 30 to its original position. If the steering shaft is turned counterclockwise, the resulting rotation of the differential screw 77 will move the nut 79 and the valve spool 99 upwardly. Accordingly, the actuator 64 will develop a clockwise torque so as to restore the shaft 30 and the valve spool 99 to their original positions.

It will be apparent that the power steering device 10 provides all of the effort needed to steer the vehicle. The driver is required to exert only the effort needed to turn the wheel hub 39 on the upper end of the power shaft 20. However, if the driver desires to exert additional effort so as to supplement the torque developed by the steering device 10, he need only turn the wheel 38 with sufficient force to take up the lost motion between the wheel key 51 and the recesses 53 in the wheel hub 39. The driver may then exert a torque directly on the hollow power shaft 20. Likewise, the vehicle may be steered manually if the hydraulic pump should fail. For such manual operation, the wheel key 51 serves as a positive connection between the steering wheel 38 and the shaft 20. The slight lost motion between the wheel and the shaft will not be found to be objectionable, particularly in view of the smoothing action of the centering spring 56.

It should be noted particularly that the power steering device combines the virtues of being able to supply the entire steering effort and yet being entirely safe. If any failure should occur in the power steering system, the vehicle may be steered manually until the cause of the failure can be corrected.

Fig. 15 illustrates a modified manner of connecting the power steering device 10 into a steering mechanism 159 or the like. In this case, the hollow shaft or quill 20 is slipped over and secured to a shaft 160, which may be any existing shaft in the mechanism 159, or may be installed as an accessory, to receive the power steering device 10. Gears 161 and 162, or any other suitable driving elements may be employed to connect the shaft 160 to a shaft 163. In this way, the power steering device 10 will be effective to rotate the shaft 163, which may be suitably connected to the steering worm drive mechanism (not shown) or other device to be actuated.

In the arrangement of Fig. 15, a sprocket 165 or other connecting element is mounted on the control hub 39 in place of the steering wheel shown in Fig. 1. The steering wheel 38 may be mounted on a rotatable sprocket 166 connected to the sprocket 165 by means of a chain 167. It will be understood that any desired connecting elements may be employed to form a driving connection between the wheel 38 and the control hub 39. With the arrangement shown in Fig. 15, the steering device 10 rotates the shaft 163 in response to any rotation of the steering wheel 38.

The arrangement of Fig. 15 is especially useful in connection with certain self-propelled machines and agricultural tractors having steering linkages of the type comprising a plurality of shafts interconnected by gears, sprockets or the like. The power steering device may be installed by removing any driven gear or sprocket from any of the shafts, whereupon the quill 20 may be slipped over the shaft and secured in place by means of the tapered collet 32. The sprocket or gear may then be mounted on the control hub 39.

Fig. 16 illustrates a modified device 10' for rotating a steering shaft 30' or any other rotatable member for which power actuation is desired. In many respects, the modified embodiment is quite similar to the first embodiment shown in Figs. 1–14. In those cases in which the components of the second embodiment correspond closely to those of the first embodiment, the former will be given the same reference characters as the latter, with the addition of the prime suffix.

As illustrated, the modified steering device 10' comprises a reversible, rotary hydraulic actuator or motor 64' which may be of the same type as in the first embodiment but may be designed for operation at a higher speed and hence may be made smaller and lighter in weight. The hydraulic motor 64' comprises meshing gears 65' and 66', the former being secured to a power shaft 220, and the latter being arranged to idle on a shaft 70'. The shaft 220 is connected to the steering shaft 30' by an arrangement which provides speed reduction together with torque multiplication. To this end, a pinion 221, mounted on the shaft 220, is arranged to mesh with a gear 222 mounted on a hollow shaft or quill 20'. The relative sizes of the pinion 221 and the gear 222 may be such as to provide a considerable torque multiplication. A tapered, longitudinally slotted collet 32' is utilized to clamp the quill 20' on the shaft 30', as in the first embodiment. A hollow nut 34' is employed to force the collet 32' into a tapered bore 31' formed in the quill 20'.

To control the modified steering device 10', a control hub 39' may be rotatably mounted on the hollow shaft 20'. A lost motion connection 50' is utilized between the control hub 39' and the shaft 20' to provide for limited differential rotation between the hub and the shaft. As in the first embodiment, the lost motion connection 50' may comprise a diametrical pin or bar 51' movable to a limited angular extent in diametrical slots 53' formed in the hub 39', the bar 51' being rotatable with the hollow quill 20'. A steering wheel 38' or other control member may be connected to the hub 39'.

Differential rotation between the wheel 38' and the shaft 30' may be detected, as in the first embodiment, by means of a differential screw 77' and nut 79', which may be operatively connected to a control valve 98', by a lever 86'. The screw 77', nut 79', and valve 98' may be constructed and arranged in the same manner as in the first embodiment. Consequently, it will not be necessary to describe these components in any further detail. It will suffice to note that the screw 77' is fitted with a gear 81' meshing with a gear 80' secured to the power shaft 220. Likewise, a gear 83', rigid with the nut 79' is in mesh with an idler gear 82' freely rotatable on the shaft 220. The idler gear 82' is connected to the control hub 39' by means of a large gear 224 which meshes with the idler gear and is secured to the control hub. The overall gear ratio between the screw 77' and the quill 20' may be made the same as between the nut 79' and the control hub 39'. In this way, the operation of the control valve 98' will be faithfully responsive, both in magnitude and direction, to any differential rotation which may occur between the control hub 39' and the quill 20'. Accordingly, the hydraulic motor 64' will be energized in a direction such as to nullify the differential rotation.

In some cases, the provision of a relatively small, high-speed hydraulic motor will tend to improve the efficiency of the power steering unit. Moreover, the reduction gearing employed in the modified embodiment may be designed to provide the desired amount of steering torque. The modified embodiment is also convenient in many cases because of its relatively light weight and small size.

While the details of various illustrative embodiments have been shown and described, it will be understood that there is no intention to limit the invention to these details. Rather it is the intention to cover all modifications, alternative constructions and equivalents falling within the spirit and scope of the invention as defined in the appended claims.

I claim as my invention:

1. A power steering device comprising a housing, a hollow shaft journaled in said housing for receiving the upper end of a steering wheel shaft on a vehicle, means for securing said hollow shaft to the steering wheel shaft, a wheel mounting member rotatable on the upper end of said hollow shaft, means for securing a steering wheel to said wheel mounting member, means forming a lost motion connection between said wheel mounting member and said hollow shaft to provide for manual steering while permitting relative movement between said wheel mounting member and said hollow shaft, a rotatable screw mounted on said housing adjacent the upper end of said hollow shaft, a rotatable and reciprocable nut received on said screw, a first pair of meshing gears mounted on said hollow shaft and said screw and forming a driving connection therebetween, a second pair of meshing gears mounted on said wheel mounting member and said nut so that said nut will be advanced axially along said screw in response to differential rotation between said hollow shaft and said wheel mounting member, a hydraulic actuator including an actuator gear mounted on said hollow shaft and a meshing idler gear journaled in said housing adjacent said hollow shaft, said housing having walls closely surrounding said actuator gears, passages in said housing communicating with opposite sides of said meshing gears adjacent the point of meshing therebetween, a lever connected to said nut for movement in response to axial movement thereof, and a valve having an axially movable spool connected to said lever and arranged to supply hydraulic fluid under pressure to said respective passages in response to movement of said spool in opposite directions, whereby said hydraulic actuator will rotate said hollow shaft so as to follow any rotation of said wheel mounting member.

2. A power steering device comprising a housing, a power shaft journaled in said housing, means for securing said power shaft to the upper end of a steering wheel shaft on a vehicle, a wheel mounting member rotatable on the upper end of said power shaft, means for securing a steering wheel to said wheel mounting member, means forming a lost motion connection between said wheel mounting member and said power shaft to provide for manual steering while permitting relative movement between said wheel mounting member and said power shaft, a rotatable screw mounted on said housing adjacent the upper end of said power shaft, a rotatable nut received on said screw, a first pair of meshing gears mounted on said power shaft and said screw and forming a driving connection therebetween, a second pair of meshing gears mounted on said wheel mounting member and said nut so that said nut will be advanced axially along said screw in response to differential rotation of said power shaft and said wheel mounting member, a double-acting hydraulic actuator for rotating said power shaft, and a valve having a movable member connected to said nut and arranged to supply hydraulic fluid under pressure to opposite sides of said actuator in response to movement of said movable member in opposite directions, whereby said hydraulic actuator will rotate said power shaft so as to follow any rotation of said wheel mounting member.

3. A power steering device comprising a housing, a power shaft journaled in said housing for connection to the upper end of a steering wheel shaft on a vehicle, a rotatably mounted wheel mounting member, means for securing a steering wheel to said wheel mounting member, means forming a lost motion connection between said wheel mounting member and said power shaft to provide for manual steering while permitting relative movement between said wheel counting member and said power shaft, a hydraulic actuator including an actuator gear mounted on said power shaft and a meshing idler gear journaled in said housing adjacent said power shaft, said housing being chambered to receive said actuator gears, and means responsive to differential rotation between said wheel mounting member and said power shaft for supplying hydraulic fluid under pressure to said actuator on opposite sides of said meshing gears whereby said power shaft is rotated so as to follow said wheel mounting member.

4. A unitary power steering attachment for a vehicle having a steering mechanism including a steering shaft, said attachment comprising, in combination, a housing, a hollow quill journaled therein for receiving the vehicle steering shaft, a tapered longitudinally slotted collet receivable in said quill, said quill having a tapered bore for receiving said collet, a hollow nut threadedly receivable in said quill for wedging said collet between said bore and the vehicle steering shaft, a rotatable steering control member carried by said housing, a hydraulic motor carried by said housing and drivingly connected to said quill, means forming a lost motion connection between said steering control member and said hollow quill to provide for manual steering while permitting relative rotation between said steering control member and said hollow quill, and valve means on said housing and connected to said hydraulic motor for controlling operation thereof in opposite directions, said valve means having operating means connected to said steering control member and said hollow quill for operating said valve means in opposite directions in response to opposite directions of relative rotation between said steering control member and said hollow quill so that said motor will rotate said quill in accordance with any rotation of said steering control member.

5. A power actuating device, comprising a rotatable power shaft, a rotatable control member, means forming a lost motion connection therebetween, first and second threadedly engaged rotatable screw elements, a first pair of meshing gears connected between said power shaft and said first screw element, a second pair of meshing gears connected between said control member and said second screw element whereby differential rotation of said power shaft and said control member will effect relative axial movement between said screw elements, a double acting hydraulic actuator for rotating said power shaft, and a valve having a movable controlling member connected to one of said screw elements and arranged to supply hydraulic fluid under pressure to opposite sides of said actuator in response to movement of said movable controlling member in opposite directions, whereby said hydraulic actuator will rotate said power shaft so as to follow rotation of said control member.

6. A power actuating device, comprising a rotatable power shaft, a rotatable control member, means forming a lost motion connection therebetween, first and second threadedly engaged rotatable screw elements, a first pair of meshing gears connected between said power shaft and said first screw element, a second pair of meshing gears connected between said control member and said second screw element whereby differential rotation of said power shaft and said control member will effect relative axial movement between said screw elements, a double acting hydraulic actuator for rotating said power shaft, a valve having a movable controlling member operable to supply hydraulic fluid under pressure to opposite sides of said actuator, and a lever connected between one of said screw elements and said movable controlling member for operating said valve whereby said hydraulic actuator will rotate said power shaft so as to follow any rotation of said control member.

7. A power steering device for connection to the upper end of a steering wheel shaft on a vehicle, said power steering device comprising a housing, a hollow power shaft journaled in said housing for receiving the upper end of the steering wheel shaft, said power shaft having means for securing said power shaft to the steering wheel shaft, a rotatably mounted wheel mounting member on said housing, means for securing a steering wheel to said wheel mounting member, means forming a lost motion connection between said wheel mounting member and said power shaft to provide for manual steering while permitting relative rotation between said wheel mounting member and said power shaft, a hydraulic actuator including an actuator gear mounted on said hollow power shaft and a meshing idler gear journaled in said housing adjacent said power shaft, said housing being chambered to receive said gears, and means responsive to differential rotation between said wheel mounting member and said power shaft for supplying hydraulic fluid under pressure to said actuator on opposite sides of said meshing gears whereby said power shaft will be rotated so as to follow said wheel mounting member.

8. A power steering device for connection to the upper end of a steering wheel shaft on a vehicle, said power steering device comprising a housing, a hollow power shaft journaled in said housing for receiving the vehicle steering shaft, a tapered longitudinally slotted collet disengageably received in said hollow power shaft, said hollow power shaft having a tapered bore therein for receiving said collet, a hollow nut threadedly received in said hollow power shaft for wedging said collet between said bore and the vehicle steering shaft, a rotatably mounted wheel mounting member on said housing, means for securing a steering wheel to said wheel mounting member, means forming a lost motion connection between said wheel mounting member and said power shaft to provide for manual steering while permitting relative rotation between said power shaft, a hydraulic actuator including an actuator gear mounted on said hollow power shaft and a meshing idler gear journaled in said housing adjacent said power shaft, said housing being chambered to receive said gears, and means responsive to differential rotation between said wheel mounting member and said power shaft for supplying hydraulic fluid under pressure to said actuator on opposite sides of said meshing gears whereby said power shaft will be rotated so as to follow said wheel mounting member.

References Cited in the file of this patent

UNITED STATES PATENTS

| | | |
|---|---|---|
| 1,467,209 | Sumner | Sept. 4, 1923 |
| 1,719,875 | Cooper | July 9, 1929 |
| 1,910,600 | Fitch | May 23, 1933 |
| 1,937,470 | Davis | Nov. 28, 1933 |
| 1,944,700 | Tait | Jan. 23, 1934 |
| 1,959,177 | Sassen | May 15, 1934 |
| 2,072,203 | Fuller | Mar. 2, 1937 |
| 2,362,930 | Robbins | Nov. 14, 1944 |
| 2,410,049 | Davis | Oct. 29, 1946 |
| 2,508,057 | Bishop | May 16, 1950 |
| 2,680,491 | Davidson | June 8, 1954 |

FOREIGN PATENTS

| | | |
|---|---|---|
| 586,206 | Great Britain | Mar. 11, 1947 |
| 618,583 | France | Mar. 11, 1927 |